(12) United States Patent
Hutchinson

(10) Patent No.: US 7,739,959 B2
(45) Date of Patent: Jun. 22, 2010

(54) OVER/UNDER MONORAIL SYSTEM FOR LONGWALL MINING OPERATIONS

(75) Inventor: Thomas L. Hutchinson, Fairmont, WV (US)

(73) Assignee: Swanson Industries, Inc., Morgantown, WV (US)

( * ) Notice: Subject to any disclaimer, the term of this patent is extended or adjusted under 35 U.S.C. 154(b) by 16 days.

(21) Appl. No.: 11/642,077

(22) Filed: Dec. 20, 2006

(65) Prior Publication Data

US 2008/0066640 A1 Mar. 20, 2008

Related U.S. Application Data

(60) Provisional application No. 60/845,743, filed on Sep. 19, 2006.

(51) Int. Cl.
*B61B 3/00* (2006.01)
(52) U.S. Cl. .......................... 104/89; 198/812
(58) Field of Classification Search ................ 104/89; 105/148; 299/34.01–34.12, 42–54
See application file for complete search history.

(56) References Cited

U.S. PATENT DOCUMENTS

| | | | |
|---|---|---|---|
| 1,570,386 A | | 1/1926 | MacCarthy |
| 3,204,755 A | * | 9/1965 | Caine ........................ 198/594 |
| 3,920,115 A | | 11/1975 | Craggs |
| 3,957,076 A | | 5/1976 | Jamison et al. |
| 3,981,541 A | | 9/1976 | Doerr et al. |
| 4,061,223 A | * | 12/1977 | McGinnis .................. 198/821 |
| 4,102,550 A | * | 7/1978 | Campbell et al. ............ 299/11 |
| 4,173,373 A | | 11/1979 | Campbell et al. |
| 4,339,031 A | | 7/1982 | Densmore |
| 4,793,462 A | | 12/1988 | McFall |
| 4,896,764 A | * | 1/1990 | Neunzert .................... 198/812 |
| 4,969,691 A | | 11/1990 | Moore et al. |
| 5,044,696 A | * | 9/1991 | Blackhurst ................. 299/41.1 |
| 5,524,548 A | * | 6/1996 | Fox ............................. 104/89 |
| 5,667,279 A | * | 9/1997 | Christopher et al. ......... 299/1.9 |
| 5,937,954 A | * | 8/1999 | Puttmann et al. ............. 175/61 |
| 5,997,101 A | * | 12/1999 | Peterson ...................... 299/64 |
| 6,058,849 A | * | 5/2000 | Ostholt et al. ................ 104/93 |
| 6,457,418 B1 | * | 10/2002 | Persson ...................... 104/166 |
| 6,758,326 B1 | * | 7/2004 | Benjamin ................... 198/812 |
| 7,207,633 B2 | * | 4/2007 | Wittenberg et al. ........ 299/37.5 |
| 2008/0066640 A1 | * | 3/2008 | Hutchinson ................. 104/89 |

FOREIGN PATENT DOCUMENTS

AU 729364 * 5/1999

* cited by examiner

*Primary Examiner*—S. Joseph Morano
*Assistant Examiner*—Jason C Smith
(74) *Attorney, Agent, or Firm*—Spilman Thomas & Battle PLLC

(57) ABSTRACT

An over/under monorail system for longwall mining operations can have a single overhead rail mounted trolley system with a pair of over/under mounted trolleys. Upper trolleys can be carried by the overhead rail, and can typically carry hydraulic pipes. A lower rail can be carried by the upper trolleys, and lower trolleys can be carried by the lower rail. The lower trolleys can typically carry electric cables. Some trolleys can be adapted to carry both flexible hydraulic hoses and electric cables, and such trolleys can be carried by either the upper or lower rails, depending upon the design of the overall system.

5 Claims, 3 Drawing Sheets

OVER/UNDER MONORAIL SYSTEM FOR LONGWALL MINING OPERATIONS

RELATED APPLICATIONS

This application claims priority to U.S. Patent Application Ser. No. 60/845,743, filed Sep. 19, 2006.

BACKGROUND

The Over/Under Monorail System for Longwall Mining Operations described herein relates overhead mounted monorail systems used with underground longwall mining systems, wherein the monorail systems manage the electrical cables and hydraulic lines associated with longwall mining systems, which are commonly used in underground coal mining operations.

The longwall mining system is operated by the mine operator and is a dynamic system where, as the coal is extracted from the operating face, the entire longwall system moves. Therefore, all the support equipment must move as well. The monorail system that handles the electric cables and the hydraulic conduits is, by necessity, a dynamic system and the design of such must account for continual movement of the longwall while the electrical power and hydraulic fluid sources remain stationary and are moved only intermittently.

Due to numerous variations in geological conditions and customary designs being used at various mining operations, any system being supplied to a particular mine must be capable of a variety of physical layouts and dimensional constraints. Hydraulic fluid to and from the pumps to the longwall face is conveyed via hoses or other conduits such as pipe. The electric power from the power center to the longwall face is conveyed via electric cables.

In the early days of mechanized longwall mining system, the electrical cables and hydraulic hoses were bundled together and dragged along the mine floor by the use of pulling devices. In these days, a typical hydraulic system included 1 ea, ¾ inch pressure hose and 1 ea, 1 inch return hose. Also, the typical voltage in use was 995 volts. As the hydraulic equipment evolved and was made larger, the demand for fluid was more and larger hoses and multiple parallel hoses became common.

When the use of 2300 volts and 4160 volts came into common practice, dragging the cable along the floor was discontinued and the introduction in the use of a festooning monorail system was adopted. The use of this system avoided the need for personnel to handle power cables and kept the cables out of the moisture associated with mine floors. For several years, cables and hoses were hung from monorail trolleys that rolled along monorail beams hung from the mine roof. Increasing hydraulic demands typically required the use of up to 4 ea, 2 inch pressure hoses and 4 ea, 2½ inch return hoses. Using a greater number of hoses became difficult and the friction loss through the hoses grows more and more unacceptable.

The use of a parallel (side-by-side) pair of monorail systems next came into use. In this type of system, there is one complete monorail system to carry the electrical cables, which can typically include an overhead, e.g., roof mounted monorail, and a number of trolleys carried on the monorail, which trolleys carry the electrical cables. Additionally, there is also a second, complete monorail system to carry the hydraulics, which can typically include a second overhead, e.g., roof mounted monorail, and a number of trolleys carried on this second monorail, which trolleys carry the hydraulic conduits. A difference in this system from prior systems is that all of the hydraulic conduits were formerly hydraulic hoses, but now much of the hydraulic conduits have been replaced by the use of pipes.

Presently, there are believed to be at least a couple such systems in use where the electrics and hydraulics are handled by two separate monorail systems. This is believed to be the existing state of the art for overhead monorail systems for longwall mining operations.

Compared to earlier monorail systems, an advantage of such side-by-side monorail systems can be a more efficient distribution of the hydraulic fluid, because the hydraulic conduits, formerly hoses, are replaced by pipes. Some disadvantages to the existing side-by-side monorail systems can be that two overhead mounted monorail beams must be handled, i.e., reclaimed, transported and re-hung, as the longwall face moves, and that the side-by-side monorail systems can occupy much of the very limited space available in a typical mine entry.

Therefore, there is a need for a more space-efficient and more easily handled monorail system.

SUMMARY

An over/under monorail system for longwall mining operations is described for managing hydraulic lines and electric cables associated with longwall mining operations, in a manner that addresses the disadvantages of the state of the art system while retaining the advantages of same. An embodiment of the over/under monorail system can generally comprise one or more, and typically a plurality, of upper trolleys adapted to be carried by a single overhead roof mounted upper rail. The upper trolleys can be adapted to carry hydraulic pipes or electric cables, but typically will carry the hydraulic pipes. The number and duty of upper trolleys may be specific to the particular installation and as described further below. The upper trolleys can support a lower rail and one or more, and typically a plurality, of lower trolleys can be carried by the lower rail. The lower rail can be permanently attached to some or all of the upper trolleys, and can be carried along with the system as it is moved along with the longwall mining system, as it also moves along. The lower trolleys can be adapted to carry hydraulic pipes or electric cables, but typically will carry the electric cables, the number and duty of which may be specific to the particular installation and as described further below.

Additional embodiments of the over/under monorail system can comprise one or more, and typically a plurality, of buffer trolleys which can be adapted to carry both electric cables and flexible hydraulic hoses. The buffer trolleys can be carried by either the upper rail or the lower rail, as desired depending upon the design of the overall system, their purpose being to account for the incremental change in distance between the non-mobile fluid source and the point of reconnection to the mobile pipes.

BRIEF DESCRIPTION OF ATTACHED DRAWINGS

A more complete understanding of an embodiment of an over/under monorail system as described herein can be obtained by considering the following description in conjunction with the accompanying drawing figures, in which.

DESCRIPTION OF CERTAIN EMBODIMENTS

Figure 1:
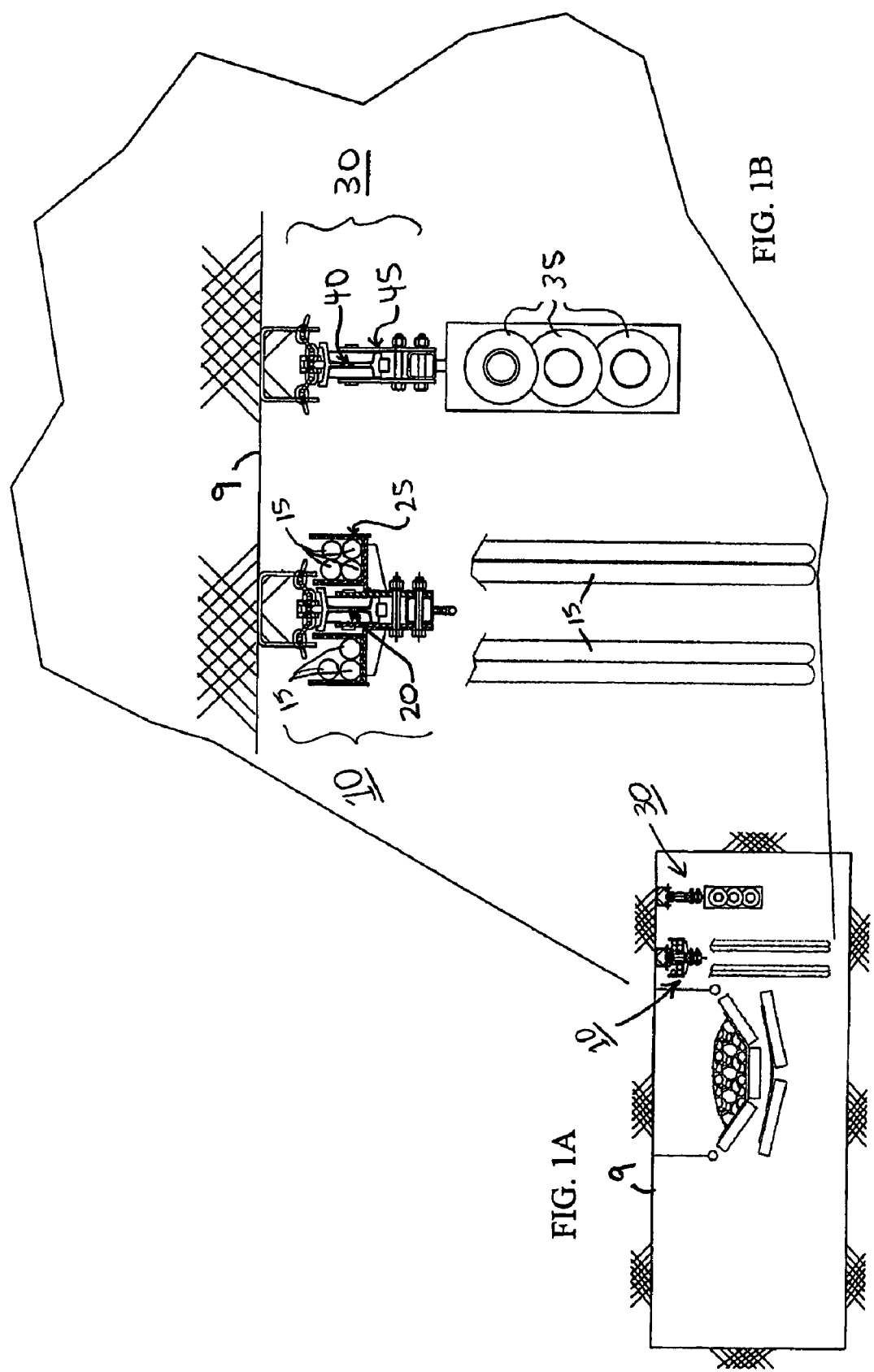
FIG. 1A is a cross section view of a prior art side-by-side pair of monorail systems.
FIG. 1B is a detail view of the prior art side-by-side pair of monorail systems shown in FIG. 1A.

Referring now to the drawing figures, in which like reference numbers indicate like parts, there is shown in FIGS. 1A and 1B a prior art type parallel (side-by-side) pair of monorail systems. In this type of system, there is one complete monorail system 10 to carry the electrical cables 15, which can typically include a first overhead monorail 20, which is mounted to the roof, or ceiling 9 of the mine, and a number of trolleys 25 carried on the monorail 20, which trolleys 25 carry the electrical cables 15. There is also a second, complete monorail system 30 to carry the hydraulic pipes 35, which can typically include a second roof 9 mounted monorail 40, and a number of trolleys 45 carried on this second monorail 40. As illustrated, the electric cables 15 are carried in a "festooned" manner, and the hydraulic pipes 35 can be carried in fashion where they are in a vertical relationship.

With the use of pipes as fluid conduits and by their nature of being rigid (i.e., non-festooning), some method of accounting for the mobile nature of the pipes being connected to a non-mobile fluid source must be resolved. This resolution can be made by the introduction of reconnection points spaced in the pipes at intervals that meet the specific system design criteria.

Some method of incremental flexibility between the non-mobile fluid source and the mobile pipe connection point must be provided and can be in the form of (a) jumper hoses being dragged along the floor and being manually or mechanically dragged back to the next reconnection point along the mobile pipe line, or (b) some buffer trolleys in the system carrying hoses in the traditional festooning fashion. The buffer trolleys begin in the situation of being "stretched" apart and incrementally get moved closer and closer as the longwall equipment moves along until the buffer trolleys are "bunched" together.

When the hoses need to be disconnected and reconnected to the pipes, some method of isolation may be provided to avoid spilling the fluid during the reconnection process.

Forces required to move (or retard movement on grades) the various system components may be provided by any number of methods ranging from manual force, cable winches or other hydraulic or mechanical means.

Some method of temporarily anchoring the trolleys that carry the cables must be provided at the location of the non-mobile power source and can be in the form of a roof-mounted anchor or floor-mounted anchor.

Figure 2:
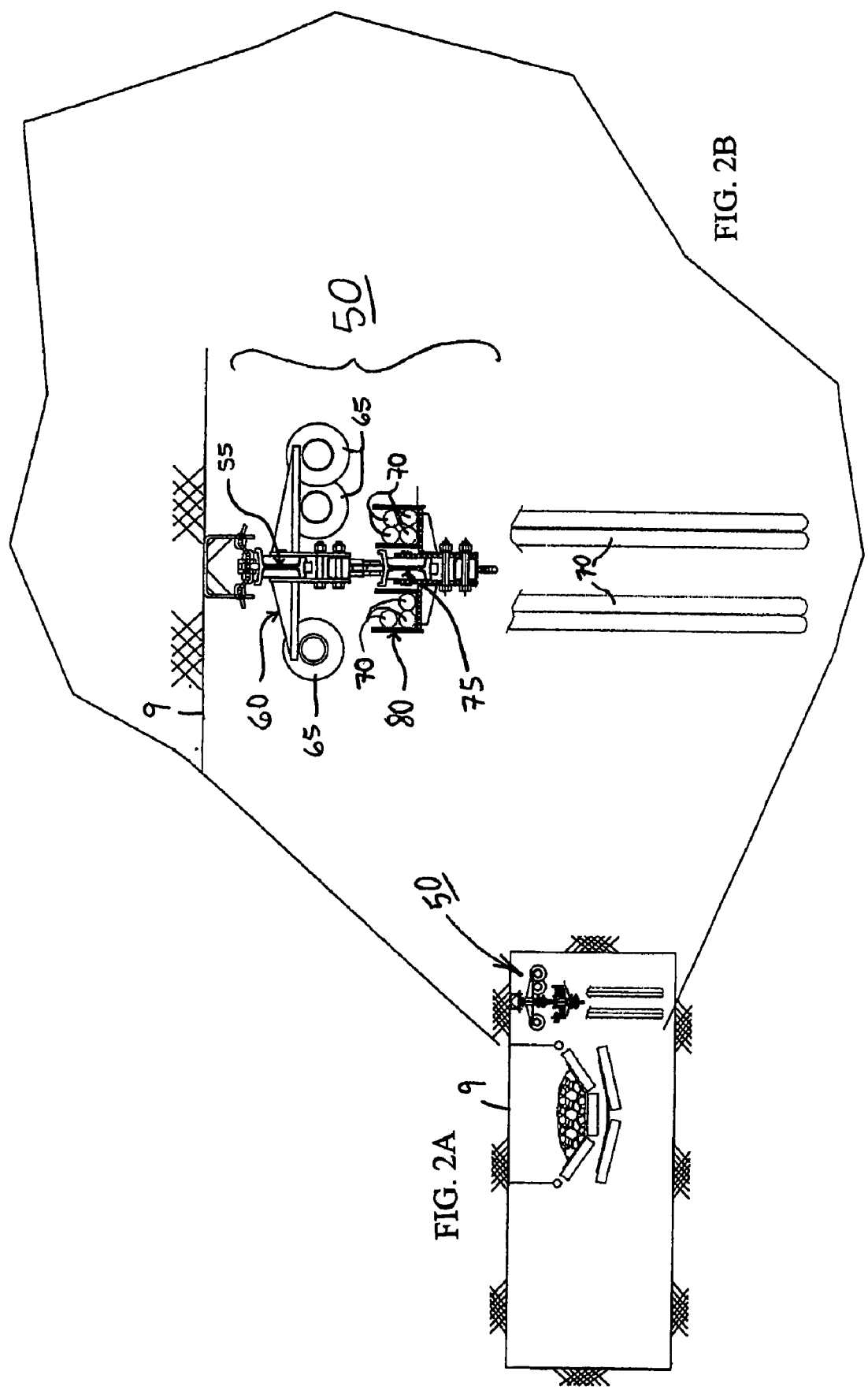
FIG. 2A is a cross section of an embodiment of an over/under monorail system.
FIG. 2B is a detail view of the over/under monorail system shown in FIG. 2A.
Figure 3:
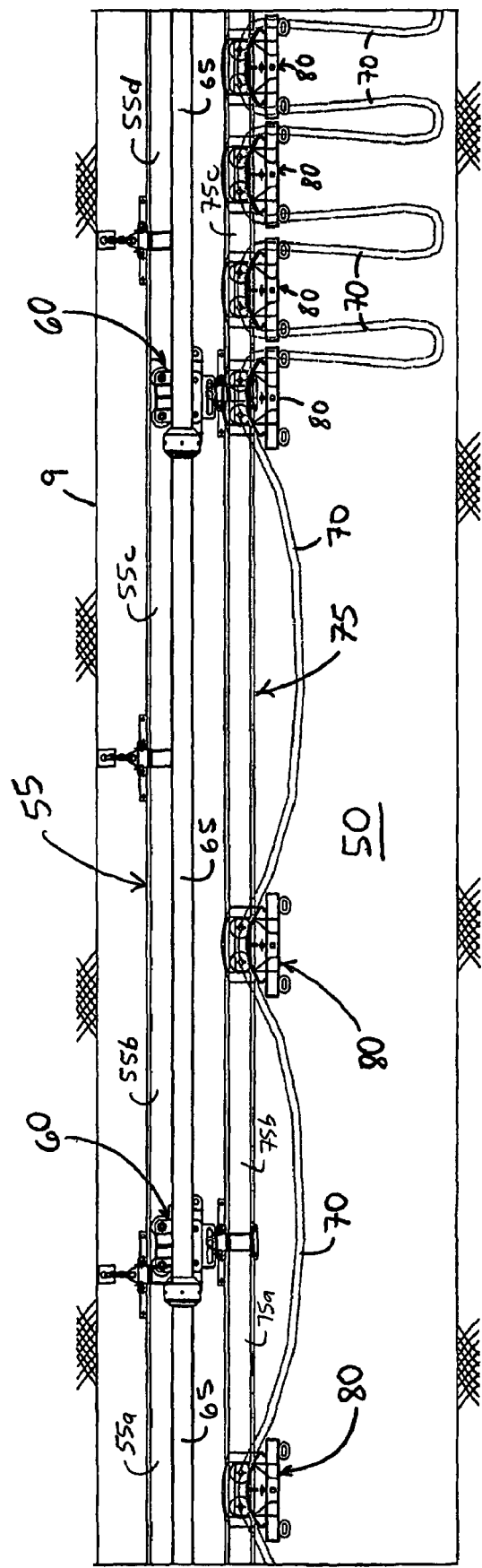
FIG. 3 is a side view of a section of an embodiment of an overall OUMS system.

Referring now to FIGS. 2A, 2B and 3, there is illustrated an embodiment of an over/under monorail system 50 for managing hydraulic lines and electric cables associated with longwall mining operations which can generally comprise a single roof 9 mounted upper rail 55 and one or more, and typically a plurality, of upper trolleys 60 adapted to be carried by the upper rail 55. The upper trolleys 60 can be adapted to carry hydraulic pipes 65 or electric cables 70, but typically will carry the hydraulic pipes 65. In this embodiment, the hydraulic pipes 65 can be carried in a horizontal relationship, in contrast to the vertical relationship used in the prior art, which can make more efficient use of space, permitting more space below the upper trolleys for the electric cables 70 to be carried in the conventional festooned manner. The upper trolleys 60 can support a lower rail 75 and one or more, and typically a plurality, of lower trolleys 80 can be carried by the lower rail 75. The lower trolleys 80 can be adapted to carry hydraulic pipes 65 or electric cables 70, but typically will carry the electric cables 70. Additional embodiments of the over/under monorail system 50 can comprise one or more, and typically a plurality, of "buffer trolleys" (not shown) which unlike the upper 60 or lower 80 trolleys, can be adapted to carry both electric cables and flexible hydraulic hoses (not shown) in the conventional festooned manner as one of the methods whereby the incremental flexibility between the non-mobile fluid source and the mobile pipe connection point is introduced. The buffer trolleys can otherwise be similar to the upper 60 or lower 80 trolleys, and can be carried by either the upper rail 55 or the lower rail 75, as desired depending upon the design of the overall system 50.

The over/under monorail system 50 can be designed with hydraulic reconnection points (not shown) whereby the incremental change in relationship between the non-mobile fluid source and the mobile pipes 65 can be accounted for in a manner that is in harmony with the overall system design. The reconnection process might typically be referred to as a "mini-power move" and might involve an operation whereby (a) the jumper hoses are removed from the connection point on the mobile pipes and dragged back to the next reconnection point or (b) the pipes are pulled forward while extending the festooning buffer trolleys back out, until the next reconnection point is in the vicinity of the source hoses.

In addition, the hydraulic reconnection points may be equipped with hydraulic isolation means to avoid spilling fluid during the reconnection process.

The over/under monorail system 50 can be designed with means of providing motive force (not shown) to propel the pipes 65 and trolleys 60 along the upper rails 55 or the lower rails 75 and means of providing motive force (not shown) to propel the cable trolleys 80 along the upper rails 55 or the lower rails 75, all in a manner that is consistent with the overall system specific design.

The over/under monorail system 50 can be designed with means of temporarily anchoring the cable-carrying trolleys 80 against movement during the times when the cables must be connected to the power source. This anchoring will induce the cable trolleys 80 to bunch together (causing the cables to festoon) as the fluid conduits get moved along. It is at the time when all the cable trolleys get totally bunched up that the system power source must be relocated, an operation typically called a "power move."

As installed, the overhead rail 55, i.e., monorail beam, which can typically be a set of connected beams, for example beams 55a-55d (shown in FIG. 3), can be attached/hung from the mine roof/ceiling running the entire distance from the longwall section to the generally stationary pumps and electrical switchgear. This distance is typically from 1000 to 2000 feet, but it can be any distance desired. According to typical operations, this single set of overhead beams, e.g. 55a-55d, must be reclaimed, i.e., taken down, transported and reinstalled at the outbye (opposite) end of the system. This reclaiming is done because as the longwall moves along, cutting the coal seam, the trolleys 60, 80 also move along the overhead rail 55, carrying along the electric cables 70 and hydraulic pipes 65. As will be described more below, the electric cables 70 and hydraulic pipes 65 can only move a limited distance along the overhead rail 55. As the trolleys 60, 80 move, the portion (individual beams) of the overhead monorail 55 which are no longer needed, i.e., the trolleys 60, 80 have moved beyond that portion, are "reclaimed." Reclamation occurs at certain intervals which will be described more below. The reclaimed beams can then be moved to the "front" of the overall length of the overhead monorail 55, where they are attached/reattached to the mine roof in order to continuously extend the overhead rail 55 as needed. In this manner, the individual beams, e.g., 55a-55d, of the upper rail 55 are basically reusable/portable, and can be taken down and reinstalled as needed, as the longwall moves along.

The hydraulic fluid conduits 65 can typically be steel pipes. The size and number of hydraulic pipes 65 varies according to design to serve the specific mine equipment being operated. However, a typical installation can consist of one 80 mm pressure pipe, one 100 mm return pipe, and one 80 mm water supply pipe, each of appropriate length for the specific design of the system.

A set of the upper trolleys 60, also called "pipe trolleys," carry the pipes 65 (rigid hydraulic lines) and are supported on, and roll along, the upper rail 55 as described above. The number of trolleys in the pipe trolley set can vary depending upon the particular design of the specific mine being supplied. The pipe trolleys also carry the lower rail 75. The lower rail 75, like the upper rail 55, can be a set of connected beams, e.g., 75a-75c (shown in FIG. 3), which are carried by the pipe trolleys 60. The lower rail 75, once installed, may not require handling since it can remain in the system until the end of the mining section. The length of the lower rail 75 would generally have to match the length of the hydraulic pipes 65, since the lower rail 75 is carried by the same trolleys 60 as the pipes 65. The lower rails 75 carry the lower trolleys 80, as described previously. The mechanism for mounting the pipes 65 and the lower rail 75 must allow for some axial displacement between these two components due to the fact that the mine entry in which the system is installed typically will undulate. The undulations will cause the relative positions of the pipes 65 and the lower rail 75 to fluctuate forward and backward. The method of mounting can be by means of a chain or a clamp with a slotted mounting hole or other method that permits axial movements.

The lower trolleys 80, also called "cable trolleys," are carried by, and roll along the lower rail 75. The cable trolleys 80 carry the electric cables 70. The number of trolleys in the cable trolley set can also vary depending upon the particular design of the specific mine being supplied.

A set of the buffer trolleys (not shown) can also be included as mentioned above, which can carry the electric cables 70 in a conventional "festooned" manner, and can additionally carry flexible hydraulic hoses (not shown), in the same festooned manner. The buffer trolleys can be supported, and roll along, either the upper rail 55 or the lower rail 75 as desired, depending upon the specific design of the system 50. The buffer trolleys can otherwise differ form the pipe trolleys 60 and the cable trolleys 80 in that the buffer trolleys can carry both electrical cables and flexible hydraulic hoses, whereas the pipe trolleys 60 typically carry only hydraulic pipes 65, and the cable trolleys 80 typically carry only electric cables 75.

The extent of the buffer trolleys is such that the net travel, i.e., the extended length minus the collapsed length, equals the cross-cut (c-c) distance for the specific mine being supplied. Usually, there will be some added distance to account for variances in the mine layout. The number of trolleys in the buffer trolley set can vary depending upon the particular design of the specific mine being supplied. In the embodiment of an overall OUMS system described above, the buffer trolleys are provided at the outbye end of the system. However, it is to be understood that the buffer trolleys could alternatively be provided near the inbye end of the system, or somewhere in the middle, between the inbye and outbye ends.

The power cables and the hydraulic supply hoses enter the OUMS system at the outbye end and usually emerge (into the section being mined by the longwall system) through one or more cross-cuts, depending upon the actual mine design.

The movement of the longwall mining system takes place in a near-continuous manner. However, the movement of certain, generally "stationary," equipment, such as the electrical power supply and the hydraulic pumps, is incremental and takes place at certain intervals determined by the actual design of the mine. The OUMS must account for the differences in the movement (continuous for the face equipment and incremental for the stationary equipment). Generally, in order to accomplish this, the pipes must have reconnection points, the buffer trolley net travel must match the pipe reconnection point locations, and the net travel of the cable trolleys must match the incremental move distances of the stationary equipment. It is to be understood that all the above-mentioned distances are a function of the mine design and operating technique, and must be coordinated in the overall system design.

The overall system design can include methods for moving the various components of the OUMS as required, and in accordance with the desire of the customer. Motive power includes such items as "Push-Pull" units and winches. Each system is designed specifically according to the customer's desired and customary manner of operations.

In one configuration of an overall over/under monorail system, the operation begins in a "stretched out" state, wherein the cables and flexible hydraulic hoses are in the fully extended position. Then, as the longwall moves, the set of rigid hydraulic pipes, as carried by the pipe trolleys, is pushed or pulled an equal distance along the upper rail. As this occurs, the buffer trolleys will bunch-up a corresponding distance. This movement is repeated until the total distance of one re-connect point is traveled. Thereafter, outbye stationary system feed hoses (which are connected to the pumps) are disconnected from the pipes and the entire system of pipes and trolleys is moved forward. This action also causes the buffer trolleys to become stretched back to their original position relative to the system. The stationary feed hoses are then re-connected to the next connection point. This operation has been dubbed a "mini-move." This moving of the system of pipes and trolleys moves the lower rail. The cable trolleys being anchored to a fixed point at the end where the stationary power source is located, and having the opposite end of the lower rail blocked, results in the lower rail being pushed through the cable trolleys causing them to become bunched together.

The sequence described above can be repeated several times (depending upon the overall design) until a major incremental stationary equipment move is required. This major move has been dubbed a "power-move."

The OUMS can have certain advantages compared to existing side-by-side pairs of monorail systems. One advantage is that the OUMS can eliminate the need for the operators to handle, i.e., reclaim, transport and reinstall, a second set of roof mounted monorail beams as is presently required by the side-by-side monorail system. Another advantage is that the OUMS reduces the width of installation required. Another benefit of the OUMS is that it is also versatile enough to be used in all normally encountered mining conditions.

Although certain embodiments of the OUMS have been described in detail, it will be appreciated by those skilled in the art that various modifications to those details could be developed in light of the overall teaching of the disclosure.

Accordingly, the particular embodiments disclosed herein are intended to be illustrative only and not limiting to the scope of the invention.

What is claimed is:

1. An over/under rail system for managing hydraulic lines and electric cables associated with longwall mining operations, comprising: stationary equipment, including an electrical power supply and a pump; a jumper hose connected to the pump; an upper rail attached to a roof of a mining area; at least one upper trolley adapted to be carried by said upper rail, said at least one upper trolley adapted to carry a hydraulic pipe said at least one upper trolley movable along said upper rail and said hydraulic pipe connected to said jumper hose; a lower rail supported by said at least one upper trolley; and a plurality of lower trolleys carried by said lower rail, one of said lower trolleys adapted to carry an electric cable connected to the electrical power supply, at least one of said lower trolleys movable along said lower rail, and one of said lower trolleys anchored to a fixed point where the electrical power supply is located.

2. The over/under rail system of claim 1 further comprising a plurality of upper trolleys which carry said hydraulic pipes and said plurality of said lower trolleys which carry said electric cables.

3. The over/under rail system of claim 2 further comprising a plurality of buffer trolleys adapted to carry electric cables and flexible hydraulic hoses, said buffer trolleys carried by one of said upper rail and said lower rail.

4. The over/under rail system of claim 1 wherein the system is moveable with a mining operation.

5. The over/under rail system of claim 1, wherein the stationary equipment is located outbye.

* * * * *